UNITED STATES PATENT OFFICE.

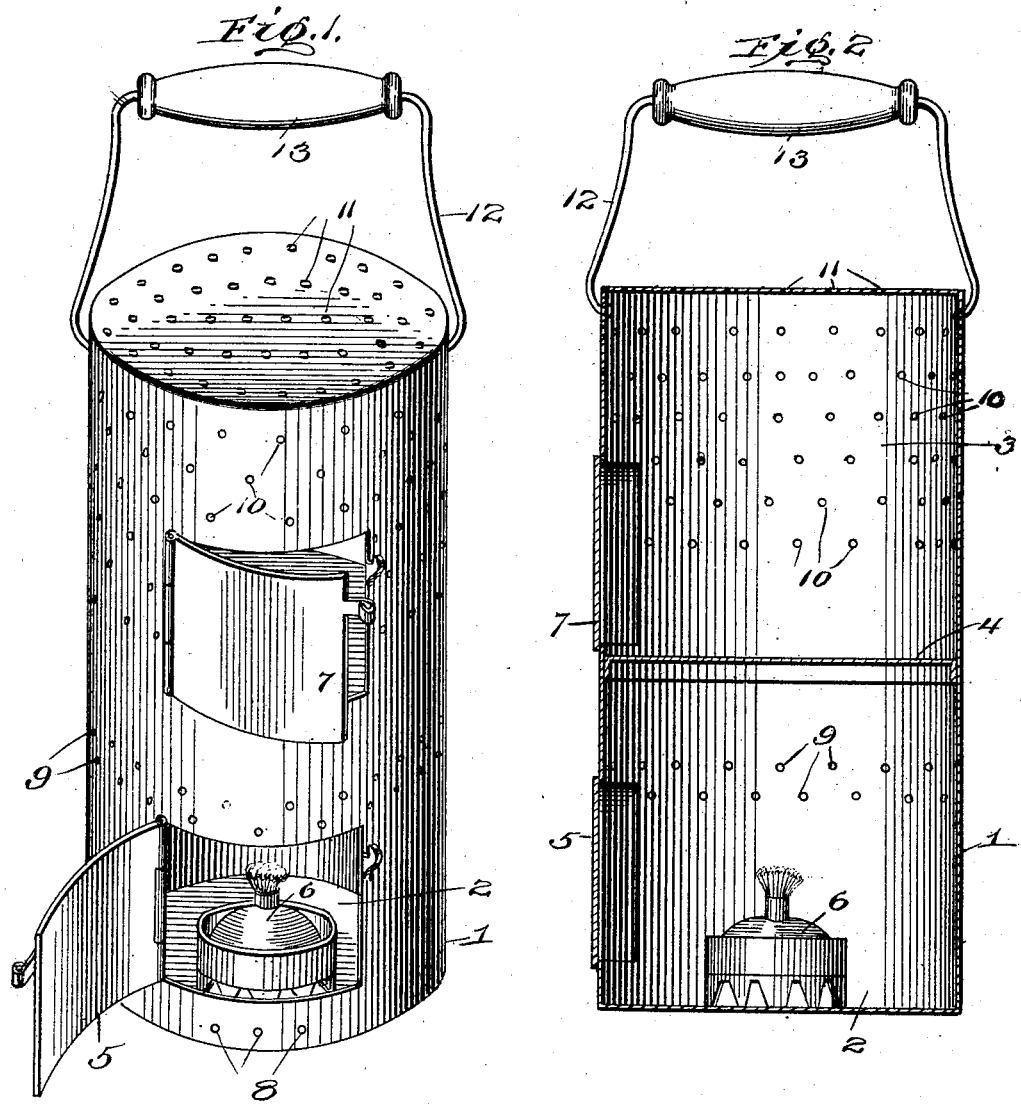

JOHN F. CONRAD, OF DORRANCETON, PENNSYLVANIA.

SULFUR-BURNER.

No. 886,948.  Specification of Letters Patent.  Patented May 5, 1908.

Application filed June 6, 1907. Serial No. 377,629.

*To all whom it may concern:*

Be it known that I, JOHN F. CONRAD, a citizen of the United States, residing at Dorranceton, in the county of Luzerne and State of Pennsylvania, have invented certain new and useful Improvements in Sulfur-Burners; and I do hereby declare the following to be a full, clear, and exact description of the invention, such as will enable others skilled in the art to which it appertains to make and use the same.

This invention relates to improvements in appliances adapted for the volatilization of sulfur as a fungicide, and the object in view is the ready and effectual regulation of the distribution of sulfur fumes.

With this and other objects in view, the invention comprises a two-compartment container, a heating apparatus arranged in one of said compartments, the other compartment being adapted to be supplied with sulfur, the second mentioned compartment having its walls provided with distributing apertures or perforations, and means being provided for controlling the volatilization of the sulfur.

The invention comprises certain other novel features of construction and combination as will be hereinafter fully specified and claimed.

In the accompanying drawing:—Figure 1 is a perspective view of one embodiment of the present invention. Fig. 2 is a longitudinal, vertical, central section thereof.

Referring to the drawings by numerals, 1 indicates a suitable container which is preferably cylindrical and which is divided into a lower compartment 2 and an upper compartment 3 by a partition 4, said partition forming a floor of the upper compartment. The lower compartment 2 is provided with a suitable door 5 affording access to an alcohol stove or other heating apparatus 6 and the upper compartment 3 is provided with a door 7 affording access thereto. The door 7, further serves as a means for regulating the volatilization of the sulfur as will be hereinafter pointed out. The walls of the compartment 2, near the lower end thereof, are provided with air intake apertures 8, and near the upper end with air discharge apertures 9—9.

The walls of the chamber 3 are formed with apertures 10, 10 which are preferably arranged in rings about the body of the receptacle 1 and extend downwardly to a point near the lower edge of the door 7. Any desired number of the apertures 10 may be provided, but by preference a relatively great number is employed, and the apertures are made comparatively small so that the sulfurous fumes will be discharged in small streams, and as evenly distributed as possible. In order to carry out the idea of even distribution of the sulfurous fumes, the cover or roof of the compartment 3 is provided with apertures 11, 11 in any desired number.

The container 1 is preferably provided with a bail 12 having a handle 13 facilitating the carrying of the container from place to place.

In operation, a supply of sulfur is placed within the compartment 3 and the door 7 is closed and retained in a closed condition by any suitable catch as illustrated. The alcohol lamp 6 or other combustion apparatus is lighted and is permitted to burn as long as desired. One of the essential features of the present invention is the regulation of the volatilization of the sulfur which is accomplished by means of adjustment of the door 7. By opening the door 7 to a greater or less extent, the admission of air may be regulated and the volatilization of the sulfur correspondingly regulated, and by such regulation the desired discharge of sulfurous fumes may be controlled to a nicety, the fumes being discharged in a comparatively highly agitated condition, which insures the destruction of mildew or other bacterial and fungoid growths of plant diseases.

It is to be noted that the present invention is especially well adapted for use in green houses, and the relatively small apertures are employed for permitting the discharge of sulfurous fumes and preventing the discharge of copious quantities of fumes which would occur if other apertures were employed.

What I claim is:—

1. In an apparatus of the class described, a container for sulfur, means for producing the volatilization of sulfur within said container, means for regulating volatilization of sulfur within the container, and a handle for carrying the container, the walls of the container being formed with a plurality of relatively small apertures.

2. In an apparatus of the class described, a container, a partition arranged therein dividing the container into upper and lower compartments, a heating apparatus arranged in the lower compartment, the upper compartment being adapted to contain sulfur, and the walls of the upper compartment being formed with relatively small apertures, and independent and adjustable means for regulating the volatilization of sulfur in the upper compartment and the supply of air to the heating apparatus.

In testimony whereof I affix my signature in presence of two witnesses.

JOHN F. CONRAD.

Witnesses:
BENJAMIN DORRANCE,
ANNE DORRANCE.